Patented Sept. 30, 1952

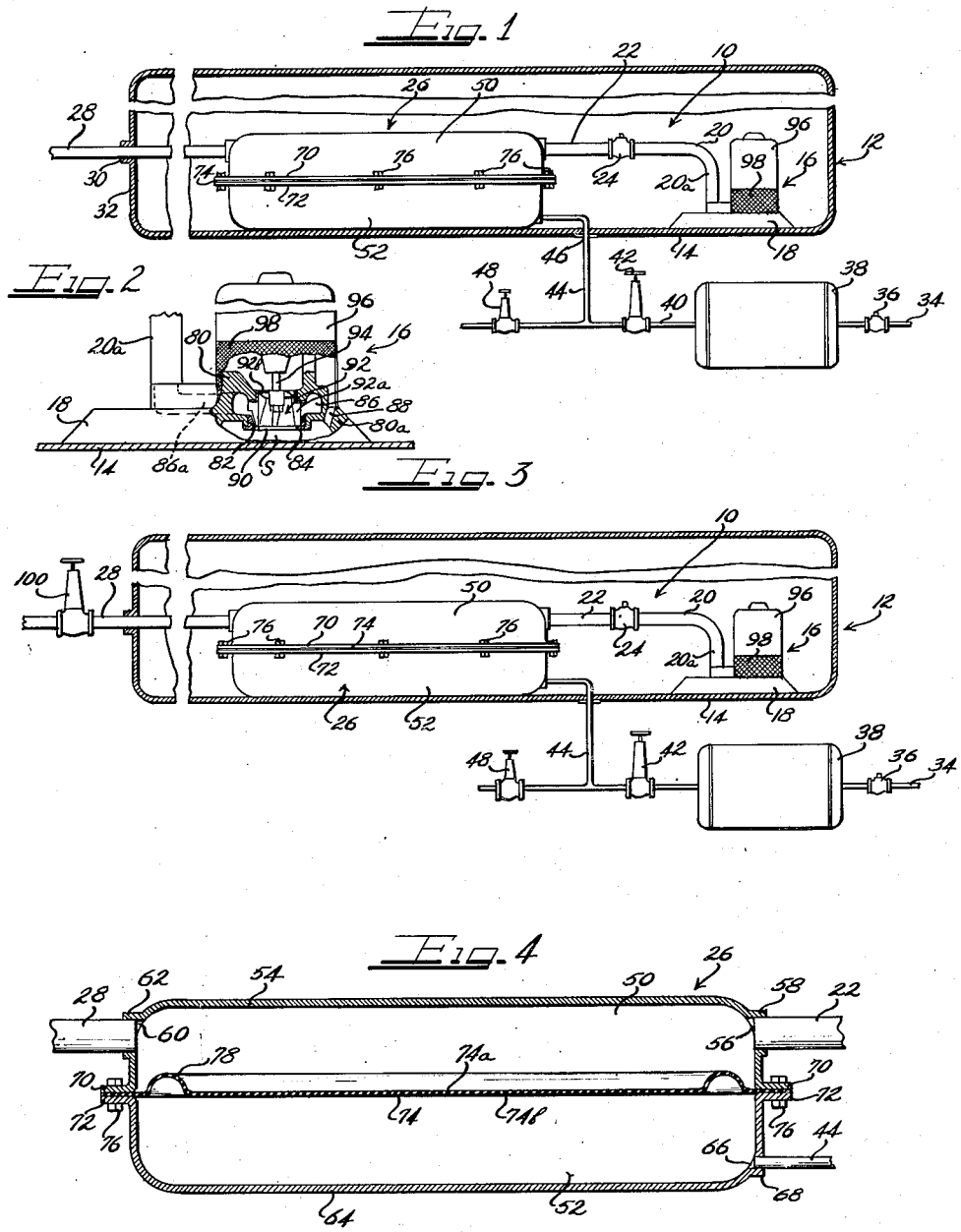

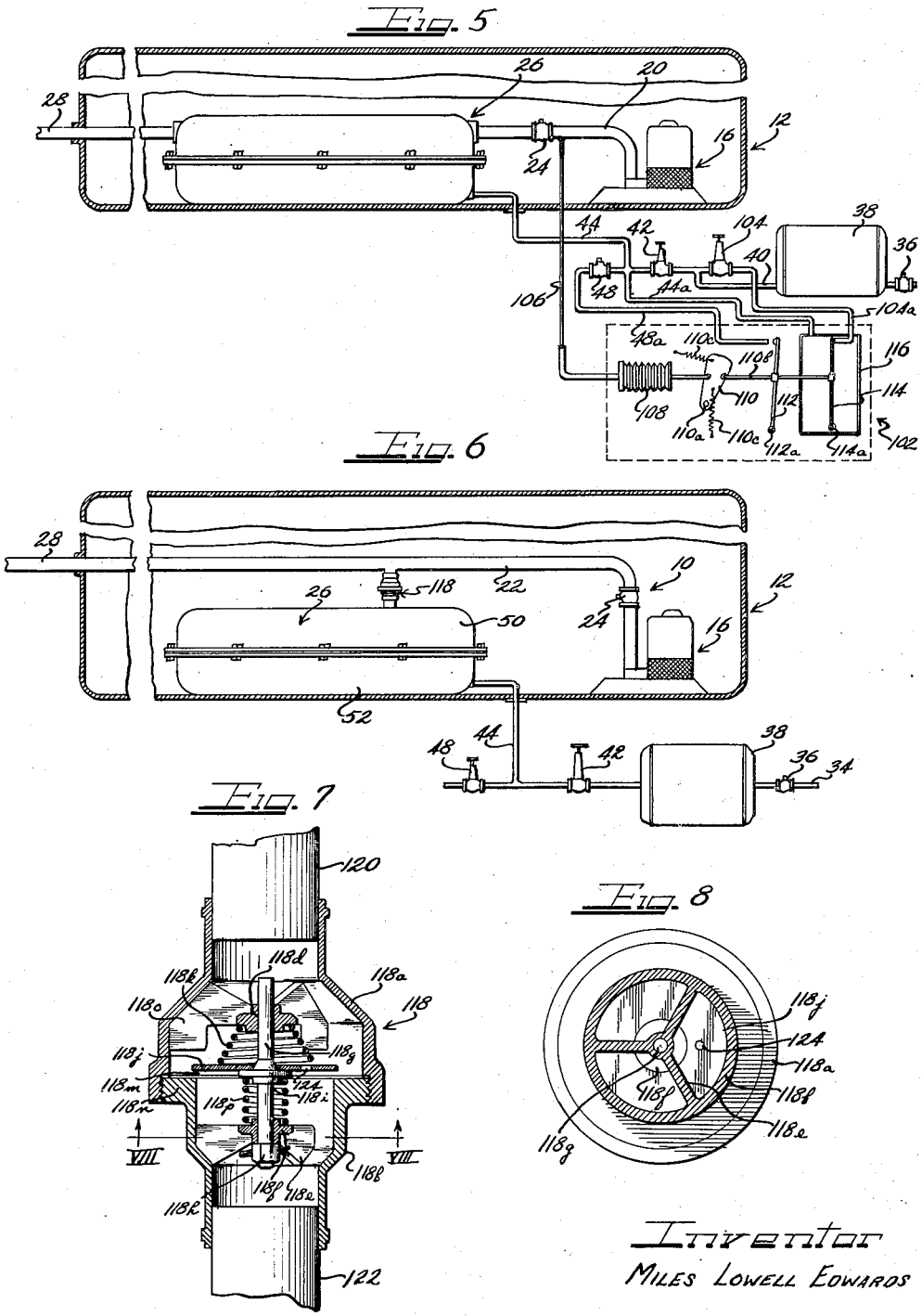

2,612,215

UNITED STATES PATENT OFFICE 2,612,215

AIRPLANE FUEL SYSTEM WITH PRESSURE ACCUMULATOR

Miles Lowell Edwards, Longview, Wash.

Application September 15, 1948, Serial No. 49,320

4 Claims. (Cl. 158—36.3)

This invention relates to a fuel pump assembly for an airplane fuel system and particularly deals with an assembly for pressuring fuel flow during emergencies and under conditions of extraordinary flight operation of the aircraft.

In aircraft fuel systems it is necessary to supply an ample feed of the fuel from the fuel cell or tank to the engine driven pump under all conditions and times of flight.

To insure the aforesaid constant feed to the engine driven fuel pump, certain difficulties must be overcome. The volatile aircraft fuel becomes more gaseous with increases in altitude and the formation of gas or vapor bubbles is encountered. These bubbles cause the formation of "airlocks" in the fuel line, interrupting the fuel supply causing interruption in engine operation. Centrifugal type booster pumps have been successfully employed to "beat out" these vapor bubbles at high altitudes and to pressure a constant supply of fuel to the engine driven fuel pump.

Another major difficulty in pressured fuel supply is encountered in the modern high speed war-type aircraft. Such aircraft are frequently called upon to dive, to perform in inverted flight and to maneuver in extraordinary positions of flight, all at high speeds. During such extraordinary flight due to the positions of the aircraft, acceleration of the aircraft or acceleration in a dive greater than gravity forces, the fuel in a partially filled cell may be withdrawn from the vicinity of the booster pump's inlet. The booster pumps are ordinarily located within the fuel cell along the bottom wall thereof. If the fuel in the partially filled cell has collected at portions of the cell remote from the booster pump, due to flight operations, the booster pump cannot supply fuel under pressure and again the engine will "run rough" and fail completely unless a supply of fuel is re-established within a short time interval.

Therefore, according to this invention, the fuel cell is equipped with a conventional booster pump adjacent its lower wall and a "bladder tank" or accumulator for accumulating a supply of fuel during ordinary flight and for pressuring this accumulated fuel to the engine driven fuel pump during the time that fuel is not accessible to the inlet of the booster pump.

The bladder tank or accumulator in this invention is horizontally disposed within the fuel cell adjacent its lower wall and near the booster pump. During ordinary flight conditions, the electric motor driven centrifugal booster pump pressures fuel through a line into an upper compartment of the accumulator and onward through the fuel line to the engine driven fuel pump. An engine driven air compressor supplies air under pressure to a lower compartment of the accumulator. The compartments of the accumulator are separated by a diaphragm or bladder. The air pressure is held constant at a figure less than the fuel pressure by a pressure regulating valve located in the air line outside of the fuel cell. A pressure relief valve is also located in the air line for operation if the air pressure should exceed a predetermined figure. A check valve is located in the fuel line between the booster pump and the accumulator. When the booster pump cannot supply pressured fuel, as during the aforedescribed extraordinary flight conditions, the air pressure in the lower compartment of the accumulator will expand the diaphragm or bladder forcing the accumulated fuel from the upper compartment of the accumulator. The fuel forced from the accumulator by the air pressure is pressured toward the engine driven fuel pump because the check valve does not permit a return of the fuel toward the booster pump. Under these conditions a supply of pressured fuel is supplied during the time in which the centrifugal booster pump cannot supply fuel, and the time for such extraordinary operation may be substantially predetermined by the size of the accumulator.

It is, then, an object of this invention to provide an improved fuel supply system for aircraft engines wherein fuel flow to the engine is insured even during temporary uncovering of the fuel intake in the tank or cell.

Another object of this invention is to provide an aircraft booster pump unit effective to pressure fuel under all conditions of aircraft flight and operation.

A further object of this invention is to provide a fuel system for supplying pressured fuel to the engine during inverted flight of the aircraft.

Another object of this invention is to provide a fuel system wherein aircraft engines may have a pressured supply of fuel during power dives and accelerations exceeding the acceleration of gravity.

A specific object of this invention is to provide a fuel pumping unit to supply a pressured fuel to the aircraft engine during all maneuvering operations of the aircraft.

A still further object of this invention is to provide an accumulator tank of such configuration and construction so as to maintain a supply of fuel to the aircraft engine during all periods of extraordinary flight operation of the aircraft.

Other and further objects of the invention will be apparent to those skilled in the art from the following detailed description of the annexed sheets of drawings which, by way of preferred example only, illustrate one embodiment of the invention.

On the drawings:

Figure 1 is a schematic showing of the booster pump, accumulator and air supply with the fuel tank or cell in broken vertical cross-section.

Figure 2 is a fragmentary elevational view of the motor driven booster pump of Figure 1 on an enlarged scale and in partial cross-section.

Figure 3 is a view similar to Figure 1, but incorporating a further pressure regulating valve.

Figure 4 is a vertical cross-sectional view of the bladder tank or accumulator.

Figure 5 is a view similar to Figure 1, but incorporates an additional pressure regulating assembly.

Figure 6 is a view similar to Figure 1 with a safety valve incorporated in the fuel line.

Figure 7 is an enlarged cross-sectional view of the safety valve in the fuel line of Figure 6.

Figure 8 is a horizontal sectional view of the valve taken as indicated by line VIII—VIII of Figure 7.

As shown on the drawings:

In Figure 1, the reference numeral 10 designates generally a pump-accumulator unit according to this invention. The unit 10 is located within a fuel cell 12, adjacent the lower wall 14.

The unit 10 employs a centrifugal booster pump 16 of conventional construction which is secured to a base plate 18 on the bottom wall 14. The booster pump 16 has a discharge line 20 which is connected to accumulator inlet pipe 22 by a check valve 24. The accumulator fuel inlet line 22 is connected to the upper portion of one end of the accumulator 26. A fuel discharge line 28 is connected to the upper portion of the opposite end of the accumulator 26. The fuel discharge line 28 passes through an aperture 30 in a side wall 32 of the fuel cell 12.

An engine driven air compressor (not shown), supplies air under pressure through an air inlet pipe 34 and check valve 36 to an air tank 38. An air outlet line 40 connects to a pressure regulating valve 42 and to an accumulator air inlet line 44. The air inlet line 44 passes through a sealed aperture 46 in lower wall 14 and connects to the lower portion of accumulator 26. A pressure relief valve 48, set to discharge at less than booster pressure, but at a pressure greater than the discharge pressure of valve 42, is located in the inlet line 44 to cooperate with the pressure regulating valve 42 in maintaining a substantially constant air pressure to the accumulator 26. The accumulator 26 is divided into an upper compartment 50 and a lower compartment 52.

As best seen with reference to Figure 4, the accumulator 26 is of split shell-like construction. The upper shell 54 is apertured at 56 and there has boss portions 58 for receiving the fuel inlet line 22. Upper shell 54 has a further aperture 60 at its opposite end and boss portions 62 for accommodating the fuel discharge line 28. The lower half shell portion 64 has an aperture 66 and boss portion 68 for receiving the air line 44. The upper half shell 54 and lower half shell 64 when placed together form the accumulator tank 26 with the split between the shells being along the longitudinal axis of the accumulator tank. The upper half shell 54 and the lower half shell 64 have flanged portions 70 and 72, respectively, about the outer periphery of their open sides. A diaphragm or bladder 74 of synthetic rubber or other flexible impervious sheeting is disposed between the half shells 54 and 64 with its outer periphery adjacent and between the outer periphery of the flanged portions 70 and 72. Suitable apertures are provided in the flanged portions 70 and 72 adjacent the outer periphery of the bladder 74 so that the half shells may be secured as by the bolts 76 with the bladder 74 therebetween effectively sealing the union between the flange portions 70 and 72. The bladder 74 thus secured in place cooperates with the upper half shell 54 to define the upper or fuel compartment 50 and cooperates with the lower half shell 64 to define the lower or air compartment 52 of the accumulator 26. Since the bladder 74, in operation, must necessarily be stretched to substantially conform to the configuration of the upper half shell 54, the humped portion 78 of bladder 74 is designed to increase the range of flexing movement of the bladder 74.

The booster pump 16 as shown in Figure 2 has a pump casing 80 with a bottom opening 82 receiving an inlet throat ring 84. Casing 80 defines the volute chamber 86 with a peripheral outlet 86a extending through the side of the casing. The lower portion of the casing 80a defines a series of peripherally spaced passages 88 through which fuel flows before reaching the lower chamber or sump S. The throat ring has a throat 90 for fuel flow into the volute chamber 86. Adjacent and above the throat 90 an impeller 92 is located which is supported by and secured to the shaft 94 of an electric motor 96. The impeller 92 is rotated by the motor 96 and includes a ring of centrifugal pumping vanes 92a and axial flow vanes 92b above the flow path surrounded by the vanes 92a for forcing bubble rich fuel back to the tank. The bubbles are beaten out of the fuel and only fully liquid fuel is pressured into the discharge 86a. A screen 98 extends between the casing 80 and the motor 96 through which fuel must pass to reach the passages 88 and through which the beaten out gas or vapor bubbles escape. The outlet end 86a of the volute chamber 86 communicates with a vertical section 20a of the fuel discharge line 20.

During ordinary flight operations and while the booster motor 96 is operated, fuel is pumped by the booster pump 16 under substantially constant pressure through the booster discharge line 20 and check valve 24 into the accumulator fuel inlet line 22 and thence through the accumulator fuel section 50 to the fuel discharge line or fuel line 28 to the engine driven fuel pump (not shown). During such operation the fuel compartment 50 will be always filled with fuel under booster pump pressure.

As previously mentioned the engine driven air compressor supplies air through the air line 34 and check valve 36 to the air storage tank 38 from where it is discharged through the air discharge line 40 to the air pressure regulating valve 42. The valve 42 is set to discharge the air at a maximum pressure less than the fuel pressure or booster pump pressure. When air is in the line on the discharge end of valve 42 at greater than this maximum discharge pressure, the valve 42 will no longer discharge. The air is then carried under the discharge pressure by the air line 44 to the air compartment 52 of the accumulator 26. Since the air pressure is less than the fuel pressure the diaphragm 74 will have a greater pressure on its upper surface 74a than it will on its lower surface 74b causing it to be deflected downwardly to some extent. If, due to mechanical difficulties arising in the fuel supply or air supply, the air pressure should substantially increase over the pressure set by the regulator valve 42, an upper limit to such air pressure is guaranteed by the incorporation of the air pressure relief valve 48 in the fuel line 44. The relief valve 48 being set to operate at a pressure lower than ordinary booster pressure and greater than the air pressure setting of the regulator valve 42.

During periods of extraordinary flight operations as previously described when fuel is withdrawn from the vicinity of the booster pump 16 so that the inlet throat 82 is uncovered and no new supply of fuel is supplied the accumulator, the engine driven fuel pump will continue to withdraw fuel from the accumulator fuel compartment 50. The fuel pressure within the compartment 50 will thus be decreased as will the pressure on the upper surface 74a of the bladder 74. When the fuel pressure has reached a pressure less than the air pressure in compartment 52, the pressure upon the lower surface 74b will be greater than that on the upper surface 74a causing the diaphragm or bladder 74 to be deflected in an upward direction. This displacement of the bladder 74 under air pressure will force the fuel from the compartment 50 into the engine fuel line 28. The fuel cannot flow back into the booster pump 16 because of the check valve 24. It is to be noted that the incorporation of the check valve 24 is an extra precautionary means for preventing the back flow of fuel into the pump 16. Ordinarily the operation of the booster 16, even while its inlet is not submerged in fuel, will prevent the back flow of fuel from the accumulator 26 into the pump 16. From the foregoing it is obvious that even during those temporary periods of unusual flight where the fuel intake line is uncovered a pressured supply of fuel to the engine driven fuel pump is insured by means of the "boost" pressure of the air in the air compartment 52 of the accumulator 26. The air boost will maintain fuel flow until the bladder or accumulator tank is emptied of fuel and the tank can be made large enough to supply fuel during prolonged temporary periods.

When recovery is made from the extraordinary flight operations and fuel again covers the booster pump inlet, the booster pump 16 again becomes operative in pressuring fuel to the accumulator. The fuel under pressure will again displace the bladder 74 to a more normal position and in so doing will force air from the accumulator which will be discharged by the pressure release valve 48. A certain amount of time is necessarily consumed in the recovery and return to ordinary booster operations. During the time of extraordinary operation and during the recovery period the booster pressure necessarily varies. For those engines requiring a more rigidly constant booster pressure, a pressure reducing valve 100 (Fig. 3), of the type having substantially constant output pressure regardless of input pressure, is incorporated in the fuel line 28 outside of the fuel cell 12. In order that the pressure reducing or regulating valve 100 shall effectively operate to maintain a constant booster pressure to the engine driven fuel pump during the aforementioned period, the pressure at the intake side of the regulating valve must be arbitrarily increased to a point above the requirement for ordinary engine operation so that expected variations in the pressure at the intake of valve 100 will not affect the pressure at the discharge side of the valve. The reducing or regulating valve 100 will discharge the fuel at the pressure required by the engine. The time interval for recovery from extraordinary operation will be decreased due to the increase in booster pressure on the bladder, and the variation in booster pressure to the engine driven fuel pump would be decreased as well.

An alternative construction designed for an increased bladder pressure during periods of booster pump failure and for a quick recovery of exhausted pressure in the accumulator tank 26 after the booster pump again starts to function is shown in Figure 5. In this construction a pressure operated air valve 102 is provided in the line between the check valve 24 and the booster pump 16. An additional air pressure regulating valve 104 is also incorporated in the air line with the original air regulating valve 42, which discharges at a pressure less than booster pressure, but the valve 104 is set to discharge air at a pressure equal to or slightly above booster pump fuel pressure. The air valve 102 is constructed to route air discharged from the air tank 38 through the original air regulating valve 42 to the accumulator 26 during normal booster pump operation and to pass air through the higher set air regulating valve 104 to bypass valve 42 during periods of booster pump inoperation. The foregoing operation of the air valve 102 is accomplished by passing fuel under booster pump pressure through a tap line 106 connected to the fuel line 20 between the check valve 24 and the booster pump 16 and passing the tapped fuel to a bellows 108 located within the air valve 102.

The bellows 108 is responsive to the booster pump fuel pressure for movement and operates a spring loaded toggle plate 110 which is pivoted about a pivot pin 110a. A toggle linkage 110b is connected to a pair of valve plug arms 112 and 114 which are pivoted respectively at their lower extremities by the pivot pins 112a and 114a. The valve plug 114 is located within an air sealed container 116 for closing or opening the discharge line 104a of the high pressure regulator valve 104. The valve plug 112 is positioned for closing or opening the discharge line 48a of the air relief valve 48. During normal booster pump operations the booster pump fuel pressure expands the bellows 108 activating the toggle plate 110 and its linkages 110b so that the valve plug 112 is unseated from the relief valve discharge line 48a and so that the valve plug 114 is seated and closing the high pressure regulator discharge line 104a. In such a position the air from the air tank 38 passes through the original air regulator valve 42, bypassing regulator 104 and on into the accumulator 26 in the regular manner.

However, during periods of booster pump inoperation and the consequent lowering of the booster pump fuel pressure in the bellows 108, the movement of the toggle plate 110 is in a counterclockwise manner (Fig. 5). The air pressure relief discharge line 48a is closed by the valve plug 112 and the valve plug 114 unseated from the high pressure discharge line 104a. In such a position, the air passing from the air tank 38 is routed through the high pressure air regulator valve 104 into discharge line 104a into the air container 116 under the higher pressure and discharged from the container 116 into the extension 44a of the air line 44 and on to the accumulator 26.

From the foregoing, it can readily be seen that during periods of booster pump inoperation and due to the toggle action of the air valve 102, the air pressure in the accumulator 26 increases to a pressure equal or slightly above the ordinary booster pump fuel pressure, thus allowing little variation in the booster pressure on the fuel to the line 28. When the booster pump 16 comes back into operation a shift within the air valve 102 occurs in the opposite direction and the air pressure within the accumulator is immediately reduced to aid in the quick recovery to normal operation of the fuel system.

For the war type aircraft where battle damage must be foreseen or expected, provisions must be made for continuous pressured fuel supply in the event of damage or inoperation of the bladder or accumulator tank. With reference to Figure 6, a special safety or check valve 118 has been incorporated in the booster fuel line 22 between the check valve 24 and the accumulator 26. The construction of the unit 10 is varied so that the fuel discharge line 28 is not connected directly to the accumulator 26 but communicates with the booster fuel line 22 at the same end of the special valve 118. It is obvious that in such a construction the safety valve 118 must allow the passage of fuel into the accumulator 26 during normal operation until the fuel compartment 50 is filled with fuel at booster pressure. Thereafter fuel from the booster pump 16 passes directly to the engine driven fuel line 28. The safety valve 118 must also allow for the passage of fuel under air pressure from the accumulator 26 into the engine driven fuel line 28 during periods when the booster pump is inoperative. The safety valve 118 must also provide for the stopping of fuel flow from the line 22 into the accumulator 26 when the bladder or accumulator tank 26 is damaged or due to some other cause loses pressure.

The construction of safety valve 118 to fulfill the foregoing requirements may be best understood in view of Figure 7. The valve 118 comprises an upper casing 118a and a lower casing 118b of smaller diameter than the upper casing and threaded into the casing 118a. The upper casing is of hollow construction containing on its inside the valve stem guide bracket 118c which supports the upper valve stem guide 118d. The lower casing 118b is likewise hollow and contains the lower valve stem guide bracket 18e which supports the lower valve stem guide 118f. Valve stem guides 118d and 118f have central apertures therethrough for accommodating the valve stem 118g. The lower extremity of the valve stem 118g is threaded to accommodate the adjusting nut 118h and has a central boss portion 118i upon which the valve gate 118j rests. A coil spring 118k is disposed about the valve stem 118g between the upper valve stem guide 118d and the valve gate 118j. A lower coil spring 118p is disposed between the central boss portion 118i on the valve stem 118g and the lower valve stem guide 118f. The spring 118p has a relatively higher compressive force than the spring 118k and as a consequence thereof the vertical position of the valve gate 118j may be adjusted by positioning the adjusting nut 118h on the valve stem 118g. As shown in Figure 7 the gate 118j is adjusted to provide a gap 118m between the gate and the valve seat 118n, when fuel under accumulator fuel pressure is present on the underside of the gate. If fuel pressure within the accumulator is withdrawn as by damage to the accumulator, the fuel under booster pump pressure in the booster fuel line 22 will enter into the safety valve intake duct 120 and on into the cavity of the upper casing 118a. Here the fuel will close the valve gate 118j against the valve seat 118n with a snap due to its pressure and due to the lack of pressure on the underside of the valve gate 118j. During booster operation, however, and while there is fuel pressure present in the accumulator 26, the accumulator fuel pressure aided by the pressure of the spring 118p will keep the valve gate 118j away from the seat 118n allowing for the gap 118m which is shown in the figure. During periods of booster pump failure due to extraordinary flight conditions, accumulator fuel pressure on the under side of the gate 118j will cause a wider gap and the fuel will leave the accumulator in the aforedescribed manner through the duct 120 and into the fuel line 28 to the engine driven fuel pump.

Accumulator fuel pressure may be greatly decreased or non-existent during the periods of time when the aircraft engine is idling and when the booster pump 16 is not operating. During recovery from such periods the valve gate 118j may be closed. It is desirable that fuel be allowed to enter the accumulator through the safety valve discharge duct 122 and this is accomplished by placing a small hole or aperture 124 in the valve gate 118j so that fuel under pressure may be slowly returned to the accumulator. When the fuel compartment 50 of the accumulator 26 has been filled with fuel under booster pump pressure the gate 118j will again be vertically displaced under the force of spring 118p and accumulator fuel pressure.

It will be understood from the foregoing that with the incorporation of the safety valve 118 that the accumulator and air pressure units can be completely inoperative and that the booster pump 16 can be completely inoperative without stopping the flow of fuel from the fuel cell to the fuel line 28, since the fuel can always flow through the impeller and casing of the pump, whenever there is a suction pull in the fuel line, as when the engine driven fuel pump is operative and the booster pump motor unit is inoperative.

It will, of course, also be understood that various details of construction may be varied through a wide range without departing from the principles of this invention and it is, therefore, not the purpose to limit the patent granted hereon otherwise than necessitated by the scope of the appended claims.

I claim as my invention:

1. In an aircraft fuel system, a fuel cell, a pump having an inlet receiving fuel from said fuel cell and a discharge connected to a supply line, a tank connected to said line through a check valve, said check valve closing upon a differential of pressure in said line over that in said tank, means permitting a small flow of fuel from said line to said tank, and means for applying pressure to fuel in said tank.

2. In an aircraft fuel system, a fuel cell, a pump having an inlet receiving fuel from said fuel cell and a discharge connected to a line for supplying fuel to the aircraft engine, a tank connected to said line through a check valve, said check valve comprising a gate urged to open position and operated to closed position by a differential of pressure in said line over that in said tank, said gate having an opening permitting a small flow of fuel from said line to said tank, and means for applying pressure to fuel in said tank.

3. A fuel system for aircraft or the like which comprises a fuel cell, a booster pump for pressuring fuel from said cell, a discharge conduit receiving pressured fuel from the booster pump, an accumulator tank having a fuel compartment and a gas compartment separated by a flexible impervious wall, means connecting the discharge conduit to the fuel compartment of the tank, a safety valve in said connecting means, means for pressuring the gas compartment of the tank so that fuel may be pressured from said tank during inoperation of said booster pump, and a valve member disposed within said safety valve urged to an open position and closed upon a differential of pressure in said conduit over that in said tank.

4. A fuel system for aircraft or the like which comprises a fuel cell, a booster pump for pressuring fuel from said cell, a discharge conduit receiving pressured fuel from the booster pump, an accumulator tank having a fuel compartment and a gas compartment separated by a flexible impervious wall, means connecting the discharge conduit with the fuel compartment of the tank, means for pressuring the gas compartment of said tank so as to displace said flexible wall and pressure fuel from said tank during inoperation of said booster pump, a safety valve interposed between said discharge conduit and said fuel compartment of said tank, a valve grate resiliently urged to open position and closed by a differential of pressure in said discharge conduit over that in said tank.

MILES LOWELL EDWARDS.

REFERENCES CITED

The following references are of record in the file of this patent:

UNITED STATES PATENTS

| Number | Name | Date |
|---|---|---|
| 1,348,916 | Winslow | Aug. 10, 1920 |
| 1,570,010 | Scowcroft | Jan. 19, 1926 |
| 1,643,539 | Bossi | Sept. 27, 1927 |
| 1,736,033 | Barlow | Nov. 19, 1929 |
| 1,810,373 | Roberts | June 16, 1931 |
| 1,888,615 | Berdon | Nov. 22, 1932 |
| 2,056,061 | Werder | Sept. 29, 1936 |
| 2,200,922 | Heigis | May 14, 1940 |
| 2,283,513 | Smith | May 19, 1942 |
| 2,300,722 | Adams et al. | Nov. 3, 1942 |
| 2,324,701 | Herman | July 20, 1943 |
| 2,330,558 | Curtis | Sept. 28, 1943 |
| 2,357,174 | Curtis | Aug. 29, 1944 |
| 2,367,692 | Samiran | Jan. 23, 1945 |
| 2,400,391 | Curtis | May 14, 1946 |
| 2,412,107 | Tannehill | Dec. 3, 1946 |
| 2,435,982 | Samiran | Feb. 17, 1948 |
| 2,474,512 | Bechtold et al. | June 28, 1949 |